July 21, 1953 K. H. DAVIS ET AL 2,646,465

VOICE-OPERATED SYSTEM

Filed March 7, 1951 4 Sheets-Sheet 1

INVENTORS: K. H. DAVIS
A. C. NORWINE

BY Harry C. Hart

ATTORNEY

INVENTORS: K. H. DAVIS
A. C. NORWINE
BY Harry C. Hart
ATTORNEY

INVENTORS: K. H. DAVIS
A. C. NORWINE
BY Harry C. Hart
ATTORNEY

VOICE-OPERATED SYSTEM

Filed March 7, 1951 4 Sheets-Sheet 4

INVENTORS: K. H. DAVIS
A. C. NORWINE
BY Harry C. Hart
ATTORNEY

UNITED STATES PATENT OFFICE 2,646,465

VOICE-OPERATED SYSTEM

Kingsbury H. Davis, Bernardsville, and Andrew C. Norwine, Short Hills, N. J., assignors to Bell Telephone Laboratories, Incorporated, New York, N. Y., a corporation of New York Application March 7, 1951, Serial No. 214,368

8 Claims. (Cl. 179—16)

This invention relates to pattern selection and has for its principal object the selection, from a group of patterns, of that one which in some preassigned sense is the optimum pattern of the group.

It has particular application to the art of speech sound recognition and identification; and, accordingly, a more particular object is to recognize or identify a pattern of phonetic elements, derived by a process of analysis from a speech sound uttered by a human voice and manifesting itself in the dimensions of frequency and time, as representing a particular spoken word.

Systems are known in which a speech sound is first broken down into its component frequencies and a signal is generated for each such component frequency, varying with it in time. These component signals are then utilized, e. g., after transmission by code or otherwise, either to reconstruct the original speech sound or to actuate the keys of a phonetic typewriter. Examples of such systems are to be found in Dudley Patents 2,238,555, 2,195,081, 2,194,298, and elsewhere.

It is a common feature of all such systems that a pattern of incoming signals is matched against each of a plurality of reference patterns which are in some manner built into the apparatus to represent a like plurality of reference sounds; and when the match is successful, the apparatus delivers an identification signal. This identification signal then operates a typewriter key, establishes or commences to establish a telephone connection for voice transmission, or carries out some other desired operation.

Human voices, however, differ widely from each other in their physical characteristics. Aside from the obvious difference of pitch as between the voices of men and women, there are also differences of loudness, speed of utterance, accent, inflection, and the like. Our ears have learned to recognize widely different speech sounds uttered in different accents as having the same meaning, but it is exceedingly difficult to design electrical or mechanical apparatus which can do as well. It is even the case that the same person speaking the same word on different occasions and under different conditions utters speech sounds which differ in some respects one from the other.

To allow the apparatus to disregard physical differences among the speech sounds which do not represent differences of meaning, it has already been suggested that appropriately proportioned margins of error or of tolerance be built into the apparatus, so that, for example, when the analyzed components of the incoming sound match the pattern of reference components to within, say, 85 per cent, the sound is accepted as a match and is otherwise rejected. This, however, is only a half measure because with some voices the incoming sound may never match sufficiently well to fall within the preassigned tolerance, while with other voices a particular speech sound may fall within the tolerance of two or more of the reference sounds with the result that the apparatus accepts it as being ambiguous.

In an application of K. H. Davis and R. K. Potter, Serial No. 102,506, filed July 1, 1949, and issued November 20, 1951 as Patent 2,575,909, and in an application of R. C. Mathes, Serial No. 116,979, filed September 21, 1949, and issued November 20, 1951 as Patent 2,575,910, this problem is attacked by eliminating, as far as possible, all meaningless differences among the incoming signals. In other words, the incoming signals are normalized, particularly in respect of energy level, speed of utterance, and pitch. While this approach to the problem represents a substantial advance in the art, it still fails to handle the extreme cases successfully, and the apparatus must still have built into it an appropriate margin of error or tolerance. It is, therefore, still true, at least in principle, that speech sounds at one extreme are rejected while sounds at the other extreme are accepted as ambiguous.

The present invention approaches the problem of matching the pattern of incoming signals to the pattern of reference signals by a different avenue. Instead of providing for acceptance or rejection on the basis of a pattern match within a preassigned margin of error or outside of it, it accepts every speech sound as matching that one of a group of reference sounds which it most nearly resembles. Thus, it operates on a "best match" basis instead of on a "match-no-match" basis. It is therefore open to the criticism that it accepts meaningless sounds as having meaning and in effect translates every incoming sound into one or other of its own reference sounds whether this is in accord with the speaker's intention or not. However, this criticism is a somewhat artificial one because, as a practical matter, the speaker using the apparatus may naturally be expected to speak the language which the apparatus is designed to "hear" and, if it contains a vocabulary of "words," to restrict himself to the words of that vocabulary. Therefore, within the limits imposed by this restriction, the apparatus of the present invention is capable of a flexibility sufficient to accommodate accents, inflections, and other speaking habits which differ from one another as widely as they do in nature.

The invention, in one of its principal forms, is actualized by breaking down each of the successive phonetic elements of an uttered speech sound into a plurality of components of appropriate type, e. g., the components of its amplitude-frequency spectrum; by providing the apparatus with a "vocabulary" of appropriately normalized reference phonetic elements in the form of a pattern of components of like character for each such reference element; by multiplying the several components of each reference element by the corresponding component of the incoming sound; by adding together and averaging all of the resulting products to form one product sum for the first reference element, a second product sum for the second reference element, and so on to an *n*th product sum for the *n*th reference element; by picking out from this group of product sums the one which has the maximum value; and finally by generating an identification signal which is particular to this maximum sum. When the invention is embodied in a phonetic typewriter, this identification signal simply energizes a relay which in turn operates a typewriter key to print the appropriate phonetic symbol. When, on the other hand, the invention is embodied in a voice-operated switching system, the phonetic element identification signals are arranged in sequence, and the resulting sequences are in turn matched against reference space patterns of a higher order, each of which now represents a whole word of a limited vocabulary, there being one such space pattern for each word of the vocabulary. Successful match of the phonetic element sequence with the word space pattern then generates a second order identification signal which may be employed to establish or commence to establish a voice path in a telephone circuit or the like.

In its simplest form, the multiplication of the components of the incoming sound by the corresponding components of the reference phonetic element is carried out by a bank of potentiometers, each of which multiplies the voltage appearing across a resistor, i. e., the component of the incoming signal, by the resistance included between one end of this resistor and an appropriately located tap which may be preset in accordance with the corresponding component of the reference element. In another embodiment, the incoming signal determines the strength of a cathode beam, while the physical counterpart of the reference element is a mask impinged by the beam whose transmissivity is made proportional to the magnitude of the corresponding reference component. The mask may be included within the same envelope as the electron gun, in which case its transmissivity is for electrons. More simply, however, the tube may be provided with a phosphorescent screen so that the brightness of the resulting spot is proportional to the electron beam strength and, therefore, to the magnitude of the incoming signal, while the mask may be a simple photographic film which is developed at different portions to different photographic densities so that its transmissivity is for light. With such an arrangement, the strength of the light passing through the mask is proportional both to the transmissivity of the mask and to the strength of the impinging beam so that multiplication results.

The picking out of the greatest product sum may likewise be carried out in various ways, a simple and direct one being an ordinary lock-out circuit. When a higher degree of resolution is desired than can be achieved in this direct fashion, the product sums may be scanned as by a commutator to charge a condenser to a voltage equal to that of the greatest product sum, while the condenser voltage is electrically differentiated to mark the instant at which this greatest product sum occurs, the resulting differential pulse being then employed to apply to a suitable storage device another voltage whose magnitude is proportional to time. This process of converting the array of different-valued product sums as they appear on a group of conductors first to a time scale and then to a voltage scale permits of the secure and unambiguous recognition of minute voltage differences.

The invention will be fully apprehended from the following detailed description of preferred illustrative embodiments thereof in which the components into which the signal to be identified is a speech sound, and in which the components into which this signal is broken down are its spectrum components, the components of the reference signal are of the same character.

Figure 1:
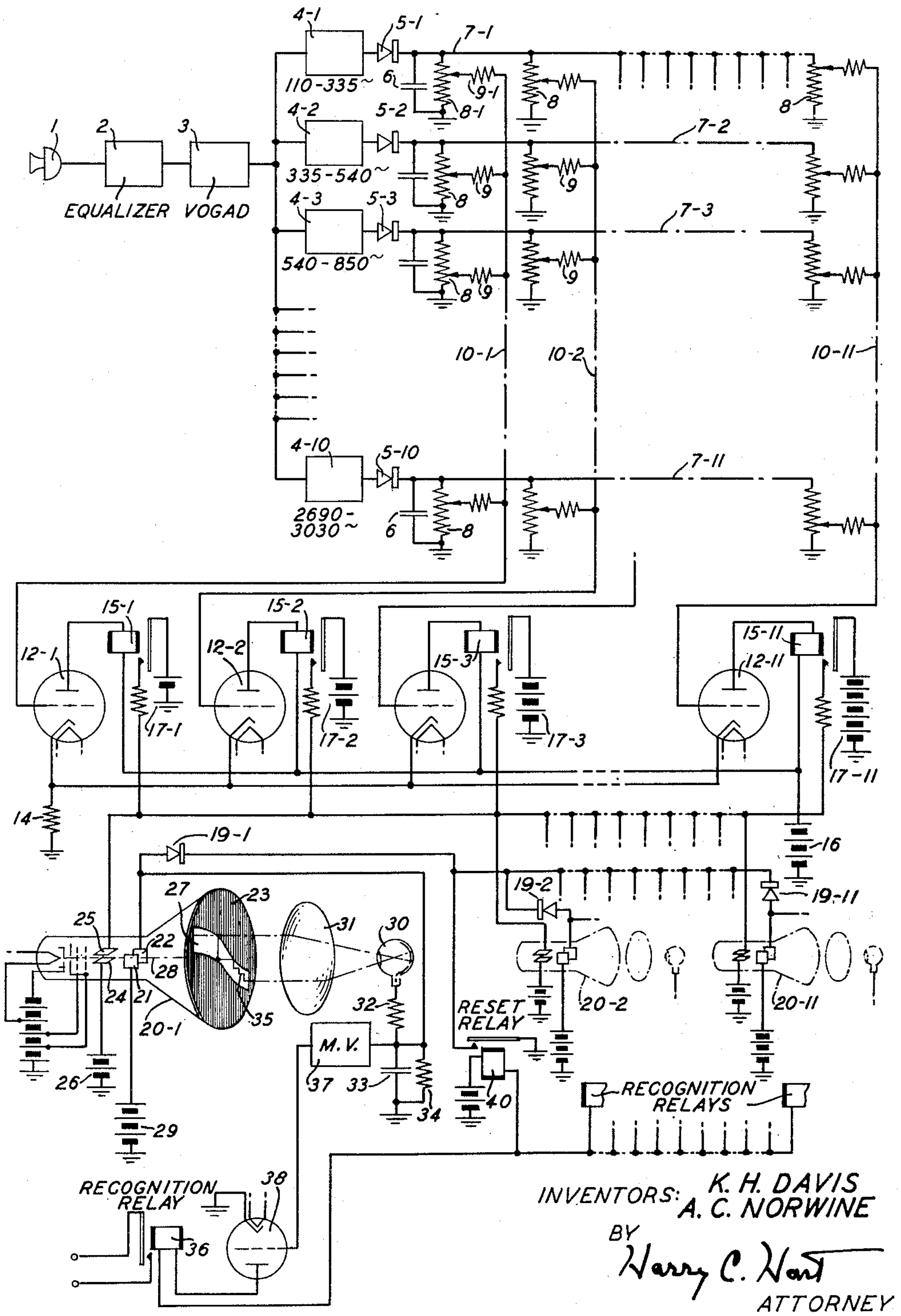
Fig. 1 is a schematic circuit diagram illustrating the invention as embodied in a word recognition system.

Referring now to the drawings and especially to Fig. 1, a voice signal originating, for example, in a microphone 1 is first passed through an equalizer 2 to accentuate the high frequency components for greater certainty of recognition and then through a level adjusting device such as a vogad 3 to compensate for differences in loudness among different voices. It is then broken down into a number of spectrum components by a bank of band-pass filters 4 whose input terminals are connected in parallel. The energy contained in each such frequency band is converted by a rectifier 5 into a steady or slowly varying current and applied to one of the horizontal conductors 7 of a cross-net. The syllabic frequency components of the energy passed by the rectifiers 5 are supported on condensers 6 which by-pass frequencies which are so high as to be of no interest.

To various points of each of the conductors 7 of this cross-net, potentiometer resistors 8 are connected to ground. For facility of illustration, these resistors are shown as arranged one above the other in columns, the number of columns being equal to the number of different phonetic elements which the apparatus is adapted to recognize. Thus, for example, if the voice signal is broken down into $m$ channels and the apparatus is adapted to recognize $n$ different phonetic elements, there are a total of $mn$ such resistors. More specifically, and as in the present example, if there are 10 channels and 11 phonetic elements, there are 110 such resistors.

Each of the resistors 8 is tapped at a certain point along its length selected in the manner described below, and a second resistor 9 is connected to each of these tapping points. All of the second resistors 9 arranged in the first vertical column of the figure and, therefore, associated with one phonetic element of the system are connected together to a vertical conductor 10—1 and to the grid of the first vacuum tube 12—1 of a bank of $n$ similar tubes. Likewise, all of the second resistors 9 in the second column and representing a different phonetic element are connected together to a second vertical conductor 10—2 and to the grid of the second tube 12—2 of the bank and so on for the resistors of the last or right-hand column representing the last phonetic element of the vocabulary which are connected together to the last vertical conductor 10—11 and to the grid of the last tube 12—11 of the bank. The cathodes of all of these tubes are connected together and by way of a high resistor 14 to ground. Their anodes are connected by way of the energizing windings of individual relays 15 to a source of anode current such as a battery 16.

The tapping points of the several first order resistors 8 of a single column are representative of the fractional amounts of the energy of the first reference phonetic element which are contained in the several frequency bands. It will be shown below how the selection of these tapping points is arrived at. Assuming for the present that they are correct, it follows that the current flowing through the second order resistor 9—1 which is connected to the tapping point of the first order resistor 8—1 of the first phonetic element and of the first channel is proportional to the product of that spectrum component of the reference element by the same spectrum component of the incoming voice and so on, each tapped resistor or potentiometer operating to multiply the energy of the incoming voice in a particular part of the frequency range by the fractional part of the energy of the reference element in the same part of the frequency range.

By virtue of the connection to the conductor 10—1 of all of the second order resistors 9 of the first column, these individual product currents for the first phonetic element are added together to form a sum of products as a voltage applied to the grid of the first tube 12—1. A similar product sum is formed by the connection together of all of the second order resistors 9 for each of the phonetic elements, each such product sum being similarly applied to the grid of one of the tubes 12.

By virtue of the common cathode resistor 14 of all of these tubes, they constitute a lock-out system such that when the grid of any one tube is raised to a potential higher than any of the others, as by the application to it of one of the product sum voltages derived as above described, the cathodes of all of the tubes are correspondingly elevated so that while the tube in question conducts, none of the others can conduct. Conduction of the one tube 12 to which such product signal was applied results in the operation of the relay 15 in its anode circuit. Similarly, if product sum voltages are applied to the grids of all of these tubes in different amounts, only that tube to which the largest product sum signal is applied conducts, the others all being cut off. Thus, one and only one of the relays 15 in the anode circuits of these tubes can be operated at a time, and the operation of that one signifies the application to the grid of the tube in whose anode circuit it is connected of the largest product sum. The bank of tubes 12 with their associated relays 15 thus constitutes apparatus for picking out of a group of signals that one which is the largest, independent of their absolute magnitudes; and when each of these signals represents a product sum, the tubes operate to pick out the largest such product sum.

The apparatus thus identifies the individual phonetic elements of the incoming speech on a "best match" basis. As indicated above, this is sufficient for the operation of a phonetic typewriter; but when it is required to recognize and identify individual spoken words, it becomes necessary to group the phonetic elements in the sequences in which they occur in each of the words to be recognized and then to recognize or identify each of these phonetic element sequences. In principle, this, too, can be done on a "best match" basis. However, this requires that both the beginning and the end of each word or phonetic element sequence be accurately defined. This requirement is incompatible with the character of ordinary speech in which successive words are run together so that it is impossible on a purely phonetic basis to assign any particular element to the beginning of one word rather than to the end of the preceding word.

Therefore, as a practical matter, the identification of the words of the vocabulary is carried out in accordance with the invention on an absolute or "match-no-match" basis rather than on a "best match" basis, and the apparatus shown in the lower part of the figure is of this character. It comprises a cathode beam tube 20 having an electron gun, accelerating and focusing electrodes which may be conventional, horizontal beam deflecting elements 21, 22, a lining of phosphorescent material on the interior wall of the enlarged end, a mask 23, which will be described below, and a pair of vertical deflecting elements 24, 25, one of which 24 is connected by way of a biasing battery 26 to ground and the other 25 to one of the contacts of all of the relays 15. For word recognition, it is contemplated that a number of such tubes 20 will be employed, all of which are alike except for the configuration of their masks 23 and in the case of each of which the upper vertical beam deflecting element 25 is directly connected to the one shown. A second one 20—2 of such tubes and a last one 20—11 are indicated by broken lines, as are also the conductors leading to the vertical deflecting elements of the remaining members of the group. The remaining contact of each of the relays 15 is connected by way of a battery 17 to ground, and the several batteries differ from one another in voltage by a suitable amount, such as one volt. Thus, for example, with 11 phonetic elements, the battery 17—1 in circuit with the first relay 15—1 is of one volt, while the battery 17—11 in circuit with the eleventh relay 15—11 is of 12 volts. With these connections, closure of any one of the relays applies to the vertical beam deflecting elements 24, 25 of all of the tubes 20 a particular value of deflecting voltage which, when balanced against the voltage of the beam bias battery 26, results in a deflection of all of the beams together to a particular height along the masks 23 at the enlarged ends of the tubes.

Outside of the envelope of each tube 20, there may be placed a mask 23 in the form of a photographic film which has been developed to a high degree of opacity to light throughout all of its area with the exception of a slot which follows a tortuous path 27 from the left-hand margin to the right-hand margin. Placed beyond the mask 23 is a photoelectric cell 30 onto which a spot of light appearing at the end of the beam tube is focused by a lens 31. The output terminals of the photoelectric cell 30 are connected by way of a resistor 32 and a condenser 33 to ground, a second resistor 34 being connected in shunt with the condenser 33. The magnitudes of these resistors are selected in relation to the sensitivity of the photoelectric cell, the characteristics of the phosphorescent material tube lining, and the opacity of the boundary portions of the mask so that when the beam impacts the tube wall adjacent the transparent slot, the photoelectric cell current charges the condenser 33, while when it impacts the tube wall adjacent the upper or lower opaque portions of the mask 23, the condenser charge is allowed to leak off through the resistor 34.

The ungrounded terminal of the condenser 33 is connected to one of the horizontal deflecting elements 22 of the cathode beam tube, while the other element 21 of this pair is connected by way of a bias battery 29 to ground. With this arrangement, when the cathode beam 28 impacts the tube end wall in line with the transparent portion 27 of the mask 23, the charge on the condenser 33 is increased, the horizontal bias voltage is overcome, and the cathode beam 28 is deflected toward the right-hand margin of the mask. When, on the other hand, the beam impacts the tube end wall in line with the upper or the lower opaque portion of the mask 23, the photoelectric cell current is reduced to a negligible value, the condenser charge leaks off, and the beam 28 is returned toward the left-hand margin of the mask 23.

It is contemplated that there shall be a number of such tubes equal to the number of words in a vocabulary which it is the function of the apparatus to recognize. A group of such words may well be those representing the digits of the group 0, 1, 2, 3 . . . 9; i. e., when the language in which the words are spoken in English, the words "oh," "one," "two" . . . "nine." The tubes 20 may be alike except for the configuration of the central path portions 27 of their several masks 23, which differ from one tube to another in accordance with the sequence in which the various phonetic elements which go to make up the word follow one another in time.

Now when the maximum product sum signal derived as described above is applied to the vertical deflecting elements of all of these tubes 20 together, all of their beams rise together along the left-hand margins of their masks. Suppose that the vertical height to which the beams thus rise is $\frac{6}{10}$ of the mask height. In the case of one of the tubes and one of the masks, and perhaps in the case of more than one, e. g., two or three, this vertical deflection of the beam results in locating the beam on the left-hand edge of the transparent mask portion so that the photoelectric cell current charges the condenser 33 and the condenser voltage is applied to the horizontal deflecting elements 21, 22 of the tube, thus operating to deflect the beam 28 in the horizontal direction away from the left-hand margin of the mask 23. Meanwhile, the beams 28 of all of the other tubes 20, which are impacting the upper or the lower opaque portions of their masks 23, are constrained against horizontal deflection by the voltage of the horizontal bias battery 29.

When the character of the incoming voice signal changes, the maximum product sum derived by the potentiometer array changes correspondingly and with it the tube in which conduction is taking place changes. The first relay to have closed opens and another relay closes instead, applying to the vertical deflecting elements of all of the beam tubes a new value of voltage. Assume, for example, that three of the beams have commenced their advance from one margin of their masks toward the other and that the incoming sound changes in such a fashion that the vertical deflection of the beam is reduced from a fractional deflection of 0.6 of the full mask height to one of 0.5. With the mask shown, this depresses the beam, as indicated by the broken line 35, when it has reached the first bend in its path so that it continues to impact the tube end wall in line with the transparent portion and, therefore, continues its movement from left to right. Assume further that in the case of both of the other beams which have commenced their left-to-right travel, the bend in the path at this point is in the other direction. These beams are therefore deflected off the transparent portions of their masks 23 and onto the lower opaque portions. The charges on the condensers 33 to which their photoelectric cells are connected cease to grow and commence to discharge through the shunt resistors. Thus, the beams return toward the left-hand margins of the masks.

From now on, a smaller number of beams are impacting the transparent path portions 27 of their masks 23, and that one which has to date succeeded in making the best match is in the lead, the others being either on the opaque mask portions or lagging behind the first one on the transparent portion. Operations continue for the leading beam in the manner described above.

If the sequence of phonetic elements is that of the particular word for which the mask is designed, only this one beam can emerge at the right-hand edge of the mask without ever having been driven off its path on to one or the other of the upper and lower opaque portions of the mask 23. Having done so, the current of this beam has at the same time charged the condenser 33 to a voltage which may exceed a preassigned threshold value, thus giving rise to a recognition signal. This recognition signal may be employed to operate a relay 36 which in turn operates a printing device, establishes or commences to establish a telephone connection, or the like.

As an illustration, a trigger circuit such as a bistable multivibrator 37 may be set to trip at the critical condenser voltage and in tripping apply a signal to the grid of a triode 38 which is otherwise held below cut-off and whose anode current, when the tube is thus actuated, operates the relay 36.

Each of the cathode beam tubes 20 of Fig. 1 with its mask 23 thus serves as a recognizer of a phonetic element sequence or word. Evidently, each time one of the recognizers of the group has recognized a word, it is required to reset this recognizer and all the others of the group to place them in readiness for recognition of the following word. This is conveniently accomplished with the apparatus of Fig. 1, wherein the anode current of each of the recognition buffer tubes 38 flows not only through the winding of a recognition relay 36 individual to the recognition cathode beam tube 20 but also through the winding of a reset relay 40 which is common to all of these tubes. Thus, each time any of the recognition relays 36 is actuated, the reset relay 40 is actuated, too. Closure of the contacts of the reset relay 40 applies ground potential to one of the horizontal beam deflecting elements 22 of all of the beam tubes 20, discharging all of the condensers 33 and returning all of the beams 28 to the left-hand margins of their respective masks 23. A rectifier 19 is included between the contacts of the relay 40 and the deflecting elements 22 of each of the tubes 20. These rectifiers serve to isolate the deflecting voltages of each of the tubes 20 from those of the others of the group during the condenser-charge part of the cycle. They are poled to interpose no significant impedance during the condenser-discharge part of the cycle, and so permit simultaneous return of all the beams 28 to the left hand margins of their respective masks 23.

Figure 2:
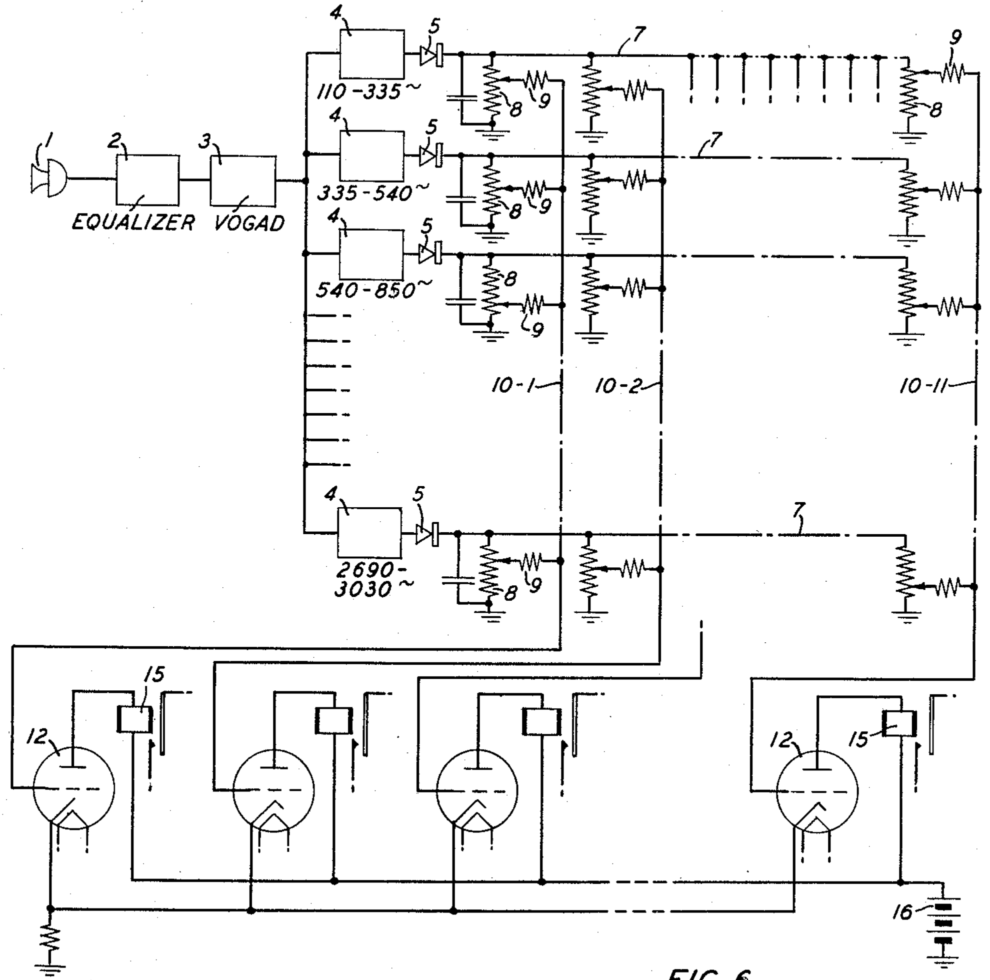
Fig. 2 is a schematic circuit diagram illustrating the invention as embodied in a phonetic typewriter.
Figure 3:
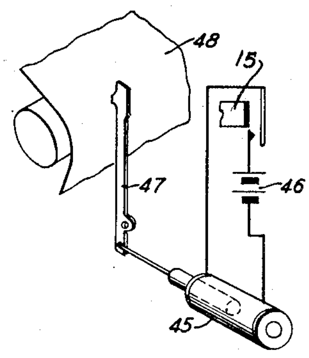
Fig. 3 is a schematic diagram illustrating a detail of the apparatus of Fig. 2.
Figure 6:
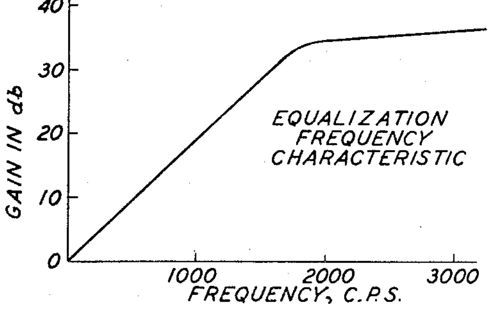
Fig. 6 is the gain-frequency characteristic curve of an equalizer which may be employed in practicing the invention.

In some cases, it may not be desired to recognize a sequence of phonetic elements but only to recognize the individual phonetic elements as they arrive. Such is the case, for example, in a phonetic element printing device as illustrated in Fig. 2. Here, the cross-net multiplier including the band-pass filters 4, the rectifiers 5, the potentiometers 8, 9, may be identical with those of Fig. 1; and the tapping points of the potentiometers may be similarly selected. So, too, may be the bank of tubes 12 which operate to pick the largest product sum. The relays 15 whose energizing windings are connected in the anode circuits of these several tubes 12 may now be connected simply to operate individual printing mechanisms such as typewriter keys. Thus, referring to Fig. 3, closure of one relay 15 may complete the circuit of a solenoid 45 through a battery 46 to draw its plunger inward and so operate a typewriter key 47 to impress a precut character on a sheet of paper 48. Similarly, operation of each of the relays operates a typewriter key to print a different character.

Figure 4:
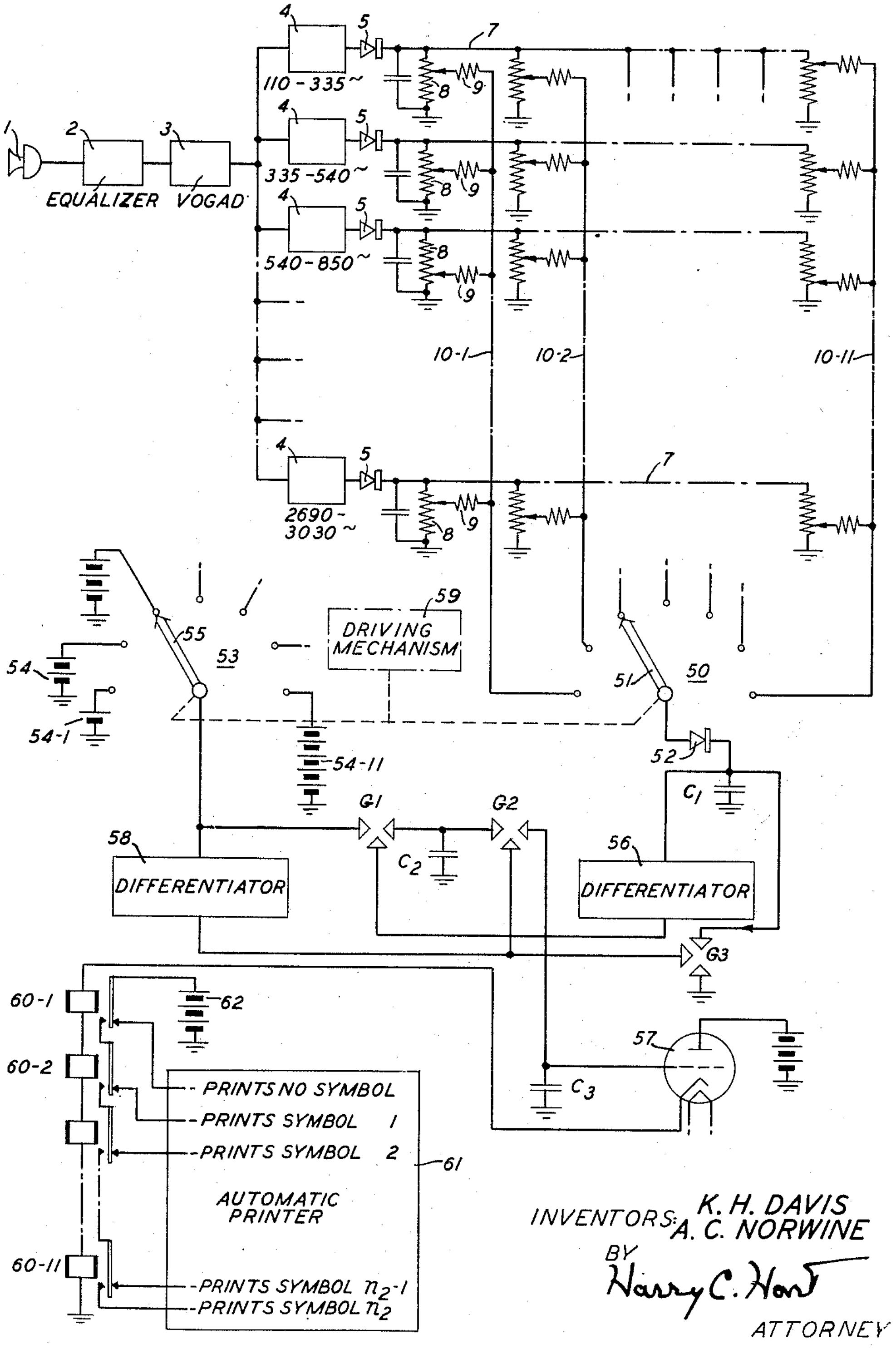
Fig. 4 is a schematic circuit diagram alternative to that of Fig. 2 and including high-resolution apparatus for picking the maximum product sum.

In Figs. 1 and 2, the bank of tubes 12 with their associated relays 15 and batteries 17 or 46 are unable to distinguish between product sums which differ in value by voltages as small as may sometimes be desired because of limitations imposed by the sharpness of cut-off of available tubes, Fig. 4 shows a more refined apparatus for picking the maximum product sum which is not subject to this limitation. Here, the cross-net with its filters 4, rectifiers 5, and potentiometers 8, 9 is the same as in Figs. 1 and 2, and the tapping points of the potentiometers are similarly selected. The several phonetic element conductors 10 are now connected to adjacent segments of a commutator 50 whose wiper arm 51 is connected by way of a rectifier 52 to one terminal of a condenser $C_1$, the other terminal of which is grounded. A second commutator 53 is provided having a number of segments equal to the number of segments of the first commutator 50; and to each of the segments of this second commutator, there is connected a source of voltage, for example, a battery 54 and these sources are arranged around the commutator in order of increasing voltage. A mechanical driver 59 of any convenient variety is provided to drive the wiper arms 51, 55 of the two commutators 50, 53 in synchronism and in phase. The ungrounded terminal of the condenser $C_1$ is connected by way of a differentiator 56 to the control terminal of a first gate $G_1$. This gate $G_1$ and other similar gates shown in the figure and in other figures and to be referred to below may be of any suitable construction. Each of them is here symbolized in a conventional fashion by a pair of arrowheads pointing toward each other with a third arrowhead pointing toward the intersection of the first two. In each case the first two oppositely located arrowheads represent conduction terminals while the third arrowhead represents a control terminal. The separation of the first two arrowheads on the drawings means that, in the absence of a control signal, the path through these conduction terminals is disestablished In each case, application of a signal to the control terminal operates to establish the path between the conduction terminals.

One conduction terminal of the first gate $G_1$ is connected to the wiper arm 55 of the second commutator 53, and its other terminal is connected to one terminal of a second condenser $C_2$ whose other terminal is grounded and also to a first conduction terminal of a second gate $G_2$. The second conduction terminal of this second gate is in turn connected to a terminal of a third condenser $C_3$ whose other terminal is grounded and to the grid of a triode 57. The wiper arm 55 of the second commutator 53 is also connected by way of a differentiator 58 to the control terminal of the second gate $G_2$ and to the control terminal of a third gate $G_3$ whose conduction terminals are connected, respectively, to the ungrounded terminal of the condenser $C_1$ and to ground.

This apparatus operates to determine which of the several phonetic element output conductors 10 carries the highest matching voltage at any time. The right-hand commutator 50 scans the phonetic element conductors 10, sampling their voltages in turn, and charges the condenser $C_1$ through the rectifier 52 to the largest voltage thus obtained. That is, when any of these phonetic element conductors carries a higher voltage than that of its predecessor, a charge increment is added to the condenser $C_1$; while when any of these conductors carries a lower voltage than that of its predecessor, no charge is removed from the condenser because, under these conditions, the rectifier 52 operates to block such charge removal. The absolute value of the resulting condenser voltage is of no importance. Rather, the fractional portion of the commutator revolution at which this maximum occurs is significant. This information is obtained by electrical differentiation of the voltage on the condenser $C_1$, giving rise to a positive pulse upon the addition of each increment in the condenser voltage. This positive pulse obtained by differentiation is applied to the control terminal of the first gate $G_1$ to establish a path through it upon the occurrence of such condenser voltage increase. When this path is established, the voltage picked up by the wiper arm 55 of the left-hand commutator 53 which, as above stated, increases linearly with the angular advance of the wiper arm, is applied to the second condenser $C_2$. Thus, each rise in the voltage on the first condenser $C_1$ results in the application of a charge to the second condenser $C_2$, charging it to a voltage which indicates the position of the commutators at the time the increment was applied. Since the charge on the first condenser $C_1$ cannot be reduced in the course of any commutator revolution, the final charge left on the second condenser $C_2$ is always that which represents the position of the commutator at which the highest matching voltage or product sum was found. At the termination of each revolution, the condenser $C_1$ is discharged, placing it in readiness for a repetition of the foregoing operations. This discharge of the condenser $C_1$ is carried out by the application of the voltage picked up by the wiper arm 55 of the left-hand commutator 53 to the electrical differentiating circuit 58 which gives rise to a large negative pulse when the wiper arm 55 of the left-hand commutator, having completed its revolution, returns from the highest voltage to the lowest at the commencement of the following revolution. This pulse is applied to the control terminal of the third gate $G_3$ and establishes a path through it from the condenser $C_1$ to ground, thus discharging this condenser and readying it for a new cycle.

At the same time, that is, at the conclusion of each revolution, the charge on the second condenser $C_2$, which, as stated above, is a measure of the portion of the cycle at which the largest product sum was found, is transferred to the third condenser $C_3$ by momentary establishment of a path through the second gate $G_2$ by the same large negative pulse from the differentiator. Thus, the condenser $C_3$, during each revolution of the commutator, carries a voltage which indicates the largest product sum and, therefore, the closest match between the various reference phonetic elements and the incoming speech during the prior revolution of the commutators. In order that this charge transfer shall not deplete the voltage of the condenser $C_2$, it suffices that the capacitance of the condenser $C_2$ be ten or more times as great as that of the condenser $C_3$.

The voltage on this third condenser $C_3$ is applied to the grid of a cathode follower 57 in which the load connected in the cathode circuit is a group of relay windings 60 of an automatic printer 61 connected in series. The contacts of these relays may be connected in the manner shown in series with a battery 62 and ground. With this arrangement, a path is established to one and only one input conductor of the automatic printer 61 which may contain a number of different printing mechanisms such, for example, as that of Fig. 3, each of which prints a single phonetic symbol when the circuit of the battery 62 is established to it. Alternatively, the cathode follower load may be a high resistor; and a phonetic element sequence recognizer of any desired type such, for example, as that of Fig. 1 comprising a number of tubes having phonetic element sequence masks, may be connected to the cathode of this tube 57.

The matching device itself may take a number of different forms, the common property of all of which is that some element representing the fractional amount of energy contained in a particular frequency band for a reference phonetic element is multiplied by the fractional amount of energy contained in the same frequency band of the incoming voice. This is the operation which is carried out by the cross-net of potentiometers of Figs. 1, 2, and 4, and the same operation is carried out by the modified apparatus of Fig. 5. Here, the incoming voice is broken down into frequency bands as before, and the distribution of energy among these bands is represented by the distribution of voltages among the conductors 7. These conductors now lead to the several control grids 71 of a cathode beam tube 70 containing a number of independent beam-generating sources or electron guns 72, each of which generates its own beam 73 under control of its own grid 71. The large end of the tube 70, impacted by the cathode beams, may be provided with a phosphorescent material lining in well-known fashion so that the brightness of the resulting spot of light due to impact of any of the cathode beams is proportional to the strength of that beam and, therefore, to the energy on one of the channel conductors 7. Outside of the envelope of the tube 70 there may be placed a mask 75 in the form of a photographic film which has been developed to different optical densities at different portions thereof so that the light transmissivity of each such portion is proportional to the expected amount of energy in a particular frequency band for one of the reference phonetic elements. Placed beyond this in turn are a lens 76 and a photoelectric cell 77 whose output is connected by way of a rectifier 52 to one terminal of a condenser $C_1$ whose other terminal is grounded.

With this arrangement, the incoming signal strength in each channel, as represented by the strength of the cathode beam 73 at each instant, is multiplied by the expected strength in the same channel for the reference element, as represented by the light transmissivity of a particular area of the mask 75.

The saw-tooth wave voltage of a sweep generator 80 is applied to the vertical deflecting elements 81, 82 of the cathode beam tube 70 to deflect all of the beams 73 from the bottom to the top of the mask 75 at uniform speed and then cause them to return rapidly to the bottom to start a new cycle. Thus, at each instant, and so for each vertical height of the cathode beams 73 along the mask 75, the beams impact the phosphorescent lining of the tube 70 to illuminate a single row of the mask areas so that the multiplication described above takes place at that instant for the various channel energies of a single phonetic element.

The output of the photoelectric cell 77 charges the condenser $C_1$ to a voltage proportional to the amount of light which reaches it. As before, each time a product sum is encountered which is larger than the prior one, an increment of charge is added to the condenser $C_1$, while when a product sum is encountered which is smaller than its predecessor, no corresponding charge increment is withdrawn from the condenser $C_1$ because, under these conditions, the rectifier 52 is in its high resistance condition. Therefore, the final voltage to which the condenser $C_1$ is charged represents the largest of these product sums which is encountered in the course of a single sweep of the beams 73. At the same time, the voltage of the condenser $C_1$ is differentiated to generate a pulse which is applied to the control terminal of a gate $G_1$, thus establishing a path for the instantaneous value of the vertical sweep voltage to a condenser $C_2$ which holds this voltage.

At the conclusion of the vertical movement of the beam, the voltage of the sweep generator 80 rapidly falls. This falling voltage is converted by the differentiator 58 into a pulse which is applied to the control terminal of a gate $G_3$, thus to establish a path to ground for the condenser $C_1$ and so to discharge it. The same pulse which operates to discharge the condenser $C_1$ at the conclusion of the vertical sweep also transfers the voltage of the second condenser $C_2$ to a third condenser $C_3$. Thus, the voltage on the condenser $C_3$ is representative of the particular instant at which the largest product sum was picked by the multiplying tube 70 in the course of the preceding vertical beam sweep. As before, the condenser $C_3$ should be of substantially smaller capacitance than the condenser $C_2$.

This voltage may be applied to a phonetic printing device 61 such as that of Fig. 4 or to the vertical deflecting elements of a phonetic element sequence recognizer which may have the same construction as that of Fig. 1. As in the case of Fig. 1, it is to be understood that there are a number of such sequence recognizers equal to the number of phonetic element sequences or words to be recognized. Each one may comprise a tube 20, a mask 23 having a slot 27, a photoelectric cell 30 with associated resistors 32, 34, condenser 33, and recognition and reset elements 36—40 which, with their interconnections, may be exactly as shown in Fig. 1. As before, all the beams of these sequence recognizers are advanced in a vertical direction along the left-hand margins of their several masks by the charge on the condenser $C_3$. Each beam which, when so advanced, falls on the path-shaped transparent portion 27 of the mask 23 then proceeds to be deflected toward the right-hand margin of the mask, and the one which successfuly travels the tortuous path of a particular mask has in so doing applied to the condenser 33 a charge of sufficient magnitude to operate the word recognition relay 36.

Figure 5:
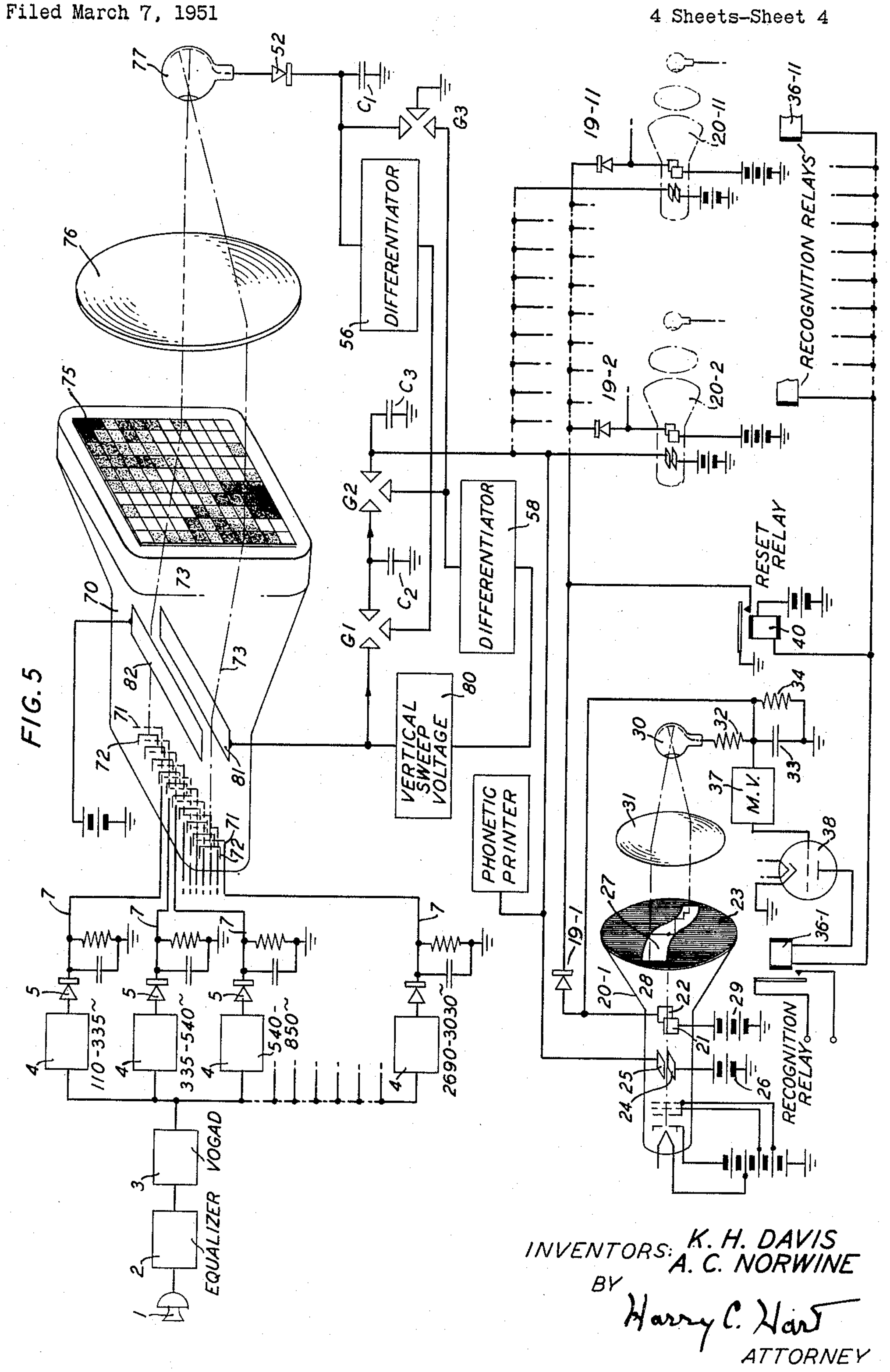
Fig. 5 is a schematic circuit diagram showing an electron beam tube counterpart of the word recognition system of Fig. 1 and including the high-resolution sum-picking apparatus of Fig. 4.

It remains to establish the tapping points of the potentiometers of Figs. 1, 2, and 4 or the optical transmissivities of the tube mask of Fig. 5 and the principles on which these settings are based.

The accepted measure of the similarity between two functions $x$ and $y$ is the so-called correlation coefficient "$r$," which is defined, for discrete values of the function, as follows:

$$r=\frac{\sum_{i=1}^{i=n}\frac{x_iy_i}{n}-\bar{x}\bar{y}}{\sigma_x\sigma_y} \qquad (1)$$

where $$\bar{x}\text{ (average of }x\text{'s)}=\sum_{i=1}^{i=n}\frac{x_i}{n}=\frac{x_1+x_2+x_3\ldots+x_n}{n} \qquad (2)$$

$$\bar{y}\text{ (average of }y\text{'s)}=\sum_{i=1}^{i=n}\frac{y_i}{n}=\frac{y_1+y^2+y_3+\ldots+y_n}{n} \qquad (3)$$

$$\sigma_x\text{ (standard deviation of }x\text{'s)}=\sqrt{\sum_{i=1}^{i=n}\left(\frac{x_i}{n}\right)^2-\bar{x}^2} \qquad (4)$$

$$\sigma_y\text{ (standard deviation of }y\text{'s)}=\sqrt{\sum_{i=1}^{i=n}\left(\frac{y_i}{n}\right)^2-\bar{y}^2} \qquad (5)$$

While it is possible to fully mechanize the computation of the correlation coefficient, a substantial simplification of the apparatus naturally results if the mechanized computation is of a simpler function, relation, or expression. It is shown below that, subject to certain conditions which are easily satisfied, equally reliable results are obtained by computing the much simpler expression $$r'=\sum_{i=1}^{i=n}\frac{x_iy_i}{n}$$

In order to simplify the typography, the limits of summation, which are always understood to be from $i=1$ to $i=n$, are omitted from the following development. Thus, $$r'=\sum\frac{x_iy_i}{n}$$

That $r'$ serves as well as $r$ as a measure of the similarity of $x$ to $y$ can be best seen after the development of the following propositions.

*Proposition I.*—A constant may be added to each of the individual reference values $y_i$ without affecting the standard deviation $\sigma_y$.

*Proof.*—The standard deviation $\sigma_{(y+a)}$ of the $y$'s when each is augmented by a constant $a$ is, from definition (5), $$\sigma_{(y+a)}=\sqrt{\frac{(y_1+a)^2+y_2+a)^2+\ldots+(y_n+a)^2}{n}-\left[\frac{y_1+y_2+\ldots+y_n+na}{n}\right]^2} \qquad (6)$$

$$=\sqrt{\frac{y_1^2 2y_1a+a^2+y_2^2+2y_2a+a^2+\ldots y_n^2+2y_na+a^2}{n}-\frac{(\sum y_i)^2+2na\sum y_i+n^2a^2}{n^2}}$$

$$=\sqrt{\frac{y_1^2+y_2^2+\ldots y_n^2}{n}-\left[\frac{\sum y_i}{n}\right]^2}$$

$$=\sqrt{\frac{\sum y_i^2}{n}-\bar{y}^2} \qquad (7)$$

which is identically equal to (5).

*Proposition II.*—Addition of a constant $a$ to every $y_i$ in the numerator of the expression for $r$ leaves it unaltered in value.

*Proof.*—The numerator of (1), each $y$ being replaced by $y+a$, is $$N=\sum x_i(y_i+a)-\bar{x}(\bar{y}+a)$$

$$=\frac{x_i(y_1+a)+x_2(y_2+a)+\ldots x_n(y_n+a)}{n}-\left(\frac{x_1+x_2+\ldots x_n}{n}\right)\left(\frac{y_1+a+y_2+a+\ldots y_n+a}{n}\right)$$

$$=\frac{x_1y_1+x_2y_2+\ldots x_ny_n}{n}+\frac{a(x_1+x_2+\ldots x_n)}{n}-\left(\frac{x_1+x_2+\ldots x_n}{n}\right)\left(\frac{y_1+y_2+\ldots y_n}{n}+a\right)$$

$$=\sum\frac{x_iy_i}{n}+a\bar{x}-\bar{x}(\bar{y}+a)$$

$$=\sum\frac{x_iy_i}{n}-\bar{x}\bar{y}$$

*Proposition III.*—A constant may be added to each of the individual reference values $y_i$ without affecting the correlation coefficient $r$.

*Proof.*—This follows immediately from Propositions I and II.

*Proposition IV.*—If the individual $y$'s are multiplied by a constant $a$, the effect of this operation on the standard deviation is to multiply it by the same constant $a$.

*Proof.*—The standard deviation of the $ay$'s is given from (5) by $$\sigma_{ay}=\sqrt{\frac{a^2y_1^2+^2y_2^2+\ldots a^2y_n^2}{n}-a^2\bar{y}^2}$$

$$=a\sqrt{\frac{y_1^2+y_2^2+\ldots y_n^2}{n}-\bar{y}^2}$$

$$=a\sqrt{\frac{\sum y_i^2}{n}-\bar{y}^2}$$

or $$\sigma_{ay}=a\sigma_{y}$$

*Proposition V.*—Multiplying each individual $y_i$ by a constant $a$ effectively increases the numerator of the expression for $r$ by the factor $a$.

*Proof.*—The numerator of (1), each $y_i$ being replaced by $ay_i$, becomes $$N=\sum\frac{x_i(ay_i)}{n}-\bar{x}(a\bar{y})$$

$$=a\sum\frac{x_iy_i}{n}-a\bar{x}\bar{y}$$

$$=a\left[\sum\frac{x_iy_i}{n}-\bar{x}\bar{y}\right]$$

and, therefore, $$\sum\frac{x_iy_i}{n}=K_1r+K_2$$

which states that when relative values or comparative magnitudes only are of interest, the quantity $$\sum\frac{x_iy_i}{n}$$

is linearly proportional to the correlation coefficient.

The foregoing is turned to account in the construction of apparatus for picking the largest of a group of product sums as follows:

The voices of seven English-speaking persons were analyzed and the results averaged, giving, for each sound of the vocabulary and for each of the ten channels indicated, the energies given in Table I. (For best articulation, a type F-1 microphone was employed in conjunction with an equalizer having the characteristic of Fig. 7.)

*Table I*

| Channel | Band | eat | sit | ate | set | sat | sun | father | foot | all | old | boot |
|---|---|---|---|---|---|---|---|---|---|---|---|---|
| 1 | 110-335 | 37 | 16 | 13 | 12 | 10 | 10 | 13 | 12 | 20 | 21 | 46 |
| 2 | 335-540 | 11 | 24 | 21 | 18 | 10 | 9.8 | 16 | 28 | 47 | 46 | 44 |
| 3 | 540-850 | 2.7 | 9.5 | 20 | 23 | 22 | 37 | 37 | 52 | 46 | 31 | 17 |
| 4 | 850-1,160 | 2.2 | 8.4 | 7.5 | 9.2 | 16 | 46 | 29 | 51 | 29 | 37 | 26 |
| 5 | 1,160-1,460 | 3.0 | 5.6 | 7.3 | 8.6 | 17 | 44 | 64 | 13 | 9.2 | 14 | 6.3 |
| 6 | 1,460-1,750 | 6.9 | 15 | 27 | 35 | 70 | 40 | 27 | 7.6 | 6.3 | 11 | 4.1 |
| 7 | 1,750-2,080 | 8.1 | 41 | 48 | 67 | 58 | 11 | 11 | 4.9 | 4.2 | 6.0 | 2.6 |
| 8 | 2,080-2,390 | 41 | 65 | 53 | 47 | 46 | 14 | 15 | 7.2 | 6.5 | 14 | 6.5 |
| 9 | 2,390-2,690 | 67 | 50 | 53 | 39 | 35 | 21 | 20 | 13 | 12 | 10 | 5.2 |
| 10 | 2,690-3,030 | 63 | 45 | 37 | 31 | 28 | 14 | 12 | 9.4 | 8.3 | 8.3 | 3.9 |

*Proposition VI.*—In the expression (1) for the correlation coefficient $r$, multiplication of each individual reference value $y_i$ by a constant $a$ leaves the expression unchanged.

*Proof.*—This follows immediately from the fact that, by virtue of Propositions IV and V, the numerator and the denominator of (1) are multiplied by the same factor $a$.

It is thus permissible to modify the reference element signals by adding constants to them, multiplying the sums by constants, subtracting constants from these products, and so on. If this is done in such a way as to normalize the reference element values in respect of the average value and standard deviation, then the quantities $\bar{y}$ and $\sigma_y$ may be treated as constants. Now, for any single trial of the incoming signal against all the reference signals, the $x$'s are all taken substantially simultaneously so that $\bar{x}$ and $\sigma_x$ may also be treated as constants. Thus, the correlation coefficient $r$ reduces to $$r=\frac{\sum\frac{x_iy_i}{n}-K_2}{K_1}$$

where $$K_1=\sigma_x\sigma_y$$

$$K_2=\bar{x}\bar{y}$$

By the multiplication and addition processes described above, the entries of Table I were normalized in respect of their average values and their standard deviations, giving rise to a new set of numbers reproduced in Table II, where, it will be seen, the average value and the standard deviation are all constant from column to column.

The process for deriving Table II was as follows:

1. Compute the average of each vertical column and subtract this value from each of the entries, making the average value of each new column zero.

2. Compute the $\sigma$ of each vertical column and divide each entry in that column by its $\sigma$. This makes the $\sigma$ of each new column equal to one.

These steps constitute the normalization in respect to average value and standard deviations of the reference values, as described above. It is now desirable to adjust these figures to make them suitable for potentiometer settings, i. e., to so change the scale that the largest value is one and the smallest value zero. This can be done by performing steps 3 and 4 as follows.

3. Reduce every number in the table by the smallest number. This makes the smallest number of the table zero.

4. Divide every number in the new table by the largest number. This makes the largest number of the new table equal to one.

*Table II*

| Channel | Band | eat | sit | ate | set | sat | sun | father | foot | all | old | boot |
|---|---|---|---|---|---|---|---|---|---|---|---|---|
| 1 | 110-335 | .47 | .17 | .09 | .08 | .04 | .15 | .07 | .35 | .21 | .35 | .82 |
| 2 | 335-540 | .19 | .28 | .22 | .17 | .07 | .19 | .06 | .85 | .45 | .80 | .78 |
| 3 | 540-850 | .10 | .09 | .19 | .24 | .21 | .12 | .56 | .56 | .83 | .74 | .35 |
| 4 | 850-1,160 | .10 | .07 | .01 | .04 | .13 | .42 | .72 | .68 | .81 | .50 | .49 |
| 5 | 1,160-1,460 | .10 | .04 | 0 | .03 | .14 | 1.0 | .67 | .22 | .23 | .17 | .17 |
| 6 | 1,460-1,750 | .15 | .17 | .31 | .41 | .85 | .38 | .61 | .16 | .14 | .12 | .13 |
| 7 | 1,750-2,080 | .16 | .50 | .62 | .89 | .68 | .11 | .08 | .06 | .10 | .08 | .11 |
| 8 | 2,080-2,390 | .51 | .82 | .71 | .59 | .53 | .17 | .14 | .22 | .14 | .12 | .17 |
| 9 | 2,390-2,690 | .79 | .62 | .71 | .47 | .38 | .25 | .26 | .14 | .22 | .22 | .15 |
| 10 | 2,690-3,030 | .75 | .56 | .45 | .37 | .29 | .12 | .13 | .1 | .17 | .15 | .13 |

The figures of Table II are now used to locate the tapping points on the resistors of Figs. 1, 2, and 4 and to determine the optical densities of the mask areas of Fig. 5.

In this table, each column represents one of the phonetic elements of the group which the apparatus is capable of identifying, and each one of them is so placed in relation to the others that its nearest neighbors resemble it more closely than do any other columns which are further removed. In this connection, the criterion of resemblance is the coefficient of correlation between any two columns.

In the multiplying apparatus of Figs. 1 and 4, the phonetic element conductors 10 are to be understood as being arranged in the same order as the columns of the table (of course, if for any reason this is inconvenient, the same effect can be secured by a corresponding alteration in the order of the batteries 17). Similarly, in the multiplying apparatus of Fig. 5, the several horizontal rows of mask areas are preferably arranged in the same order.

The choice of this order for the arrangement of the physical elements is dictated by the consideration that, regardless of minor deviations from it normal phonetic element values, a spoken word shall still be identified by virtue of the provision of an appropriate margin for error in the form of the width of the transparent portion 27 of each of the masks 23.

In the tables, each set of entries corresponds to spectrum components of one of the set of eleven vowel sounds listed at the top of the table, and none of them undertakes to represent the spectrum components of any consonant. It is a fact that the particular small vocabulary of ten words which is employed in this specification to illustrate the invention can be recognized on the basis of vowel sounds alone without the assistance of the spectrum components of the consonants, which, of course, form parts of these words as uttered in the course of speech. Greater refinement and certainty could be achieved by the inclusion of multiplying elements for the spectrum components of the consonants; and for different or larger vocabularies, this may be necessary. In the case of the particular vocabulary, it is not necessary and has been omitted in the interest of simplicity of the drawings and description.

From the foregoing, it might be thought that the inclusion in the tables of the spectrum components of two of the vowels, namely, those of the fifth and eighth columns of the tables, serves no purpose. They are included for the sake of completeness of the vowel sound vocabulary and also to assist in providing a margin for deviations of pronunciation from the norm.

While the invention has been described in connection with an illustrative embodiment in which the incoming signal is broken down along the frequency scale into a number of different spectrum components and each of these is then multiplied by a corresponding component of a reference signal, it is equally applicable to a situation in which the signal is broken down in some other way, e. g., into components which differ in amplitude, in time of occurrence, etc., the multiplying factors being then the corresponding components of the reference signal. The products may then be summed and the greatest of the resulting sums selected in the fashion described above.

What is claimed is:

1. Apparatus for selecting that one of a restricted plurality of reference signals which most nearly resembles an incoming signal, which comprises means for analyzing said incoming signal into a plurality of individually identified components, means for analyzing each of said reference signals into a like plurality of similarly identified components, means for effectively multiplying each of said incoming signal components by the similarity identified component of each one of said reference signals to form a product for each multiplication, means for grouping said products by reference signal groups, means for adding together all of the products of each group to form, for each group, a product sum, and means for selecting the greatest among said product sums, thereby to identify said incoming signal as having the characteristics of a particular one of said reference signals.

2. Apparatus as defined in claim 1 wherein the means for analyzing each reference signal comprises a group of impedance elements whose magnitudes are respectively proportioned to the several components of said reference signal, and wherein the multiplying means comprises means for deriving a current proportional to each component of the incoming signal and means for applying said currents to similarly identified impedance elements.

3. Apparatus as defined in claim 2 wherein each impedance element is a resistor having two terminals and an intermediate tap located at an electric distance from one terminal which is proportional to that component of the reference signal to which said impedance element corresponds.

4. Apparatus as defined in claim 1 wherein the means for analyzing said incoming signal comprises a beam tube having means for generating a plurality of energy beams and means for modulating the intensity of the several beams in accordance with the energies of the several components of said incoming signal, and wherein the means for analyzing said reference signal comprises a mask in the path of said beams having a plurality of individual areas arranged in groups, one group for each reference signal, the transparencies of the several areas of each such group being proportional to the energies of the several components of that reference signal, and wherein the multiplying means comprises energy-responsive means located in the path of said beams and beyond said mask.

5. Apparatus as defined in claim 1 wherein the means for selecting the greatest product sum comprises a monotonically increasing auxiliary signal, means for sequentially sampling said product sums, a first register, means for applying to said first register the magnitude of said auxiliary signal each time a sum sample exceeds all prior samples, a second register, means for applying to said second register the last of said registered magnitudes, a plurality of load devices, and means for selectively actuating said load devices in accordance with the magnitude applied to the second register.

6. Apparatus for selecting that one of a restricted plurality of reference phonetic elements which most nearly resembles an incoming phonetic element of a speech sound, which comprises means for analyzing said incoming phonetic element into a plurality of individually identified components, means for analyzing each of said reference phonetic elements into a like plurality of similarly identified components, means for effectively multiplying each of said incoming phonetic element components by the similarly identified component of each one of said reference phonetic elements to form a product for each multiplication, means for grouping said products by reference phonetic element groups, means for adding together all of the products of each group to form, for each group, a reference signal product sum, and means for selecting the greatest among said product sums, thereby to identify said incoming phonetic element as having the characteristics of a particular one of said reference phonetic elements.

7. In combination with apparatus as defined in claim 6, means for arranging successive greatest product sums in the order in which phonetic elements occur in a spoken word, means for similarly ordering the phonetic elements of a reference word, means for comparing said ordered product sums with said similarly ordered phonetic elements, and means for generating a word-identification signal when said comparison is successful.

8. In combination with apparatus as defined in claim 6, a space pattern representative of the succession of phonetic elements of a reference word, a pattern-tracing element, means for locating said tracing element in one dimension in relation to said pattern in accordance with the phonetic element for which said sum is greatest, means for repeating said operations for each phonetic element of said word in sequence, and means for advancing said pattern-tracing element in the other dimension in relation to said pattern in accordance with the degree to which its path coincides with said pattern.

KINGSBURY H. DAVIS.
ANDREW C. NORWINE.

No references cited.